Straw & Armstrong,
Buckle,

Nº 20,222.    Patented May 11, 1858.

UNITED STATES PATENT OFFICE.

W. STRAW AND R. H. ARMSTRONG, OF HUDSON, MICHIGAN.

HARNESS-TUG BUCKLE.

Specification of Letters Patent No. 20,222, dated May 11, 1858.

*To all whom it may concern:*

Be it known that we, WILLIAM STRAW and RANSOM H. ARMSTRONG, of Hudson, in the county of Lenawee and State of Michigan, have invented a new and Improved Buckle Designed Chiefly for Harness-Tugs; and we do hereby declare that the following is a full, clear, and exact description of the same, reference being had to the annexed drawings, making a part of this specification, in which—

Figure 3:
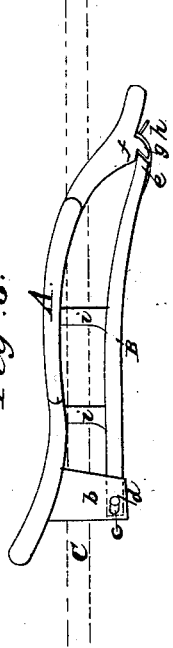
Figure 1:
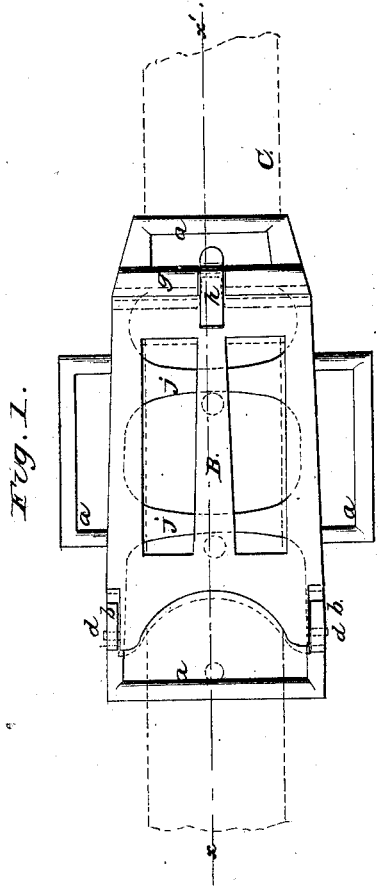
Figure 2:
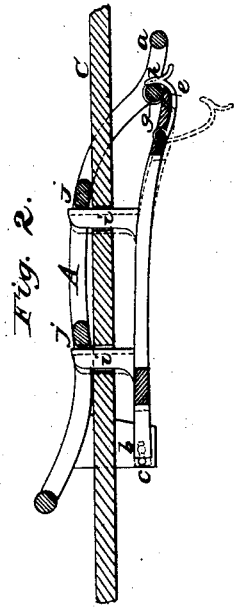

Figure 1, is a face view of our improvement. Fig. 2, is a section of ditto, taken in the line $x$, $x$ Fig. 1. Fig. 3, is a side view of ditto.

Similar letters of reference indicate corresponding parts in the several figures.

This invention consists in having a plate attached by a sliding joint to a frame, the plate being provided with one or more tongues and so arranged in connection with a catch, that the tug can be readily adjusted so as to be of greater or less length as desired and at the same time the connection rendered much more secure than by the usual buckles.

To enable those skilled in the art to fully understand and construct our invention we will proceed to describe it.

A, represents what may be termed the frame of the buckle. This frame is constructed of metal and has a loop or eye $a$, at each end and at each side so that the usual straps may be connected to it.

On the frame A, near one end, projections $b$, $b$, are formed. These projections extend from the frame A, at right angles, one from each side, and in the outer end of which oblong slots $c$, $c$, are made, one in each projection.

B, is a plate one end of which is provided with journals $d$, $d$, which fit in the slots $c$. The front end of the plate B, is beveled as shown at $e$, in Fig. 3, and when the front end of the plate B, is secured or fastened down to the frame A, the beveled end fits in a V-shaped groove $f$, made in a cross piece $g$, of the frame, and the front edge of the plate is allowed to slide in and out from said groove $f$, in consequence of the journals $d$, $d$, fitting in the oblong slots $c$, $c$, forming sliding joints. To the front end of the plate B, a catch $h$, is attached, said catch when the front end of the plate is secured down on the frame, fitting over the crosspiece $g$, and in a groove made circumferentially therein and preventing the plate B, from casually moving, so that its front end cannot pass out from the groove $f$.

To the inner side of the plate B, two tongues $i$, $i$, are attached. These tongues project from the plate B, at right angles, and are placed one before the other and extend, when the plate B is closed, through the frame A, and by the side of cross bars $j$, $j$ thereof which serve as bearings for the tongues, see Fig. 2.

C, is the tug or strap, which, when the plate B, is raised, passes longitudinally through the frame A, and when the plate B, is secured down to the frame, the tongues $i$, $i$, pass through holes in the tug or strap forming thereby, a secure connection.

It will be seen from the above description that the strap or tug that is secured in the buckle may be readily lengthened or adjusted, for the plate B, may be easily disengaged from the frame A, and raised, consequently the improvement will prove valuable for harnesses and other purposes, where thick or heavy straps are connected, and which are difficult on account of their stiffness to disengage and adjust, when the old buckles are used.

Having thus described our invention what we claim as new and desire to secure by Letters Patent, is—

The plate B, provided with one or more tongues $i$, attached to the frame A, at one end by means of a sliding joint and attached at the opposite end to the frame by means of a catch $h$, and dove-tail connection formed by the groove $f$, in the crosspiece $g$, of the frame and the beveled front end $e$, of plate B, the whole being arranged as and for the purpose set forth.

WILLIAM STRAW.
R. H. ARMSTRONG.

Witnesses:
WILLIAM W. TREADWELL,
EPHRAIM D. KIDDER.